United States Patent [19]

Harper

[11] Patent Number: 4,749,112
[45] Date of Patent: Jun. 7, 1988

[54] CARRIERS FOR BEVERAGE CONTAINERS

[76] Inventor: James B. Harper, 26 Market Place, Warwick, CV34 4SL, England

[21] Appl. No.: 117,435

[22] Filed: Nov. 2, 1987

Related U.S. Application Data

[63] Continuation of Ser. No. 767,987, Aug. 21, 1985, abandoned.

[30] Foreign Application Priority Data

Aug. 28, 1984 [GB] United Kingdom ................. 8421755

[51] Int. Cl.$^4$ ................................................ B60R 7/00
[52] U.S. Cl. .......................... 224/42.45 R; 224/42.42; 248/311.2
[58] Field of Search ............... 224/42.42, 42.43, 42.44, 224/42.45 R, 273, 282, 42.46 R; 220/854; D7/70; 248/311.2, 313, 316.5, 316.6

[56] References Cited

U.S. PATENT DOCUMENTS

| | | | |
|---|---|---|---|
| 2,215,402 | 9/1940 | McDonald | 220/85 H |
| 2,289,701 | 7/1942 | Engel | 248/311.2 |
| 2,463,651 | 3/1949 | Stevens | 215/101 |
| 2,628,054 | 2/1953 | Fazakerley | 248/311.2 |
| 2,903,225 | 9/1959 | Weinstein | 248/311.2 |
| 2,926,879 | 3/1960 | Dietrich | 224/42.45 R |
| 3,712,235 | 1/1973 | Russ | 108/46 |
| 3,719,305 | 3/1973 | Pressnell | 220/85 H |
| 3,840,204 | 10/1974 | Thomas et al. | 224/42.45 R |
| 3,842,981 | 10/1974 | Lambert | 224/42.45 R |
| 4,390,102 | 6/1983 | Lane | 211/71 |
| 4,535,923 | 8/1985 | Manke | 224/42.45 R |
| 4,634,089 | 1/1987 | Wright et al. | 248/311.2 |
| 4,655,425 | 4/1987 | Wallace et al. | 248/311.2 |

FOREIGN PATENT DOCUMENTS

| | | |
|---|---|---|
| 7918985 | 7/1979 | Fed. Rep. of Germany . |
| 2833398 | 2/1980 | Fed. Rep. of Germany . |
| 8323166 | 11/1983 | Fed. Rep. of Germany . |
| 2294612 | 7/1976 | France . |
| 462313 | 3/1937 | United Kingdom . |

Primary Examiner—Henry J. Recla
Assistant Examiner—David Voorhees
Attorney, Agent, or Firm—Sughrue, Mion, Zinn, Macpeak and Seas

[57] ABSTRACT

A carrier comprises a holder 10 extending from a body 14 securable to a support, the holder defining an opening 16 for receiving a beverage container. The carrier may be formed of a plastics material. The holder includes a pair of arms 12 which are resiliently deformable for retaining a wine glass, and the holder is pivotally mounted to the body for movement between an operative position, and an inoperative position in which there is a retentive interference fit between the arms and the body. A lower base 38 is provided to help retain a canned drink, and an upper flange 46 is provided to help retain by cantilever action a plate on the holder. The body is releasably secured to a support by a removable rigid tongue 52 for insertion between the window and the body of a vehicle door.

8 Claims, 4 Drawing Sheets

CARRIERS FOR BEVERAGE CONTAINERS

This is a continuation of application Ser. No. 767,987 filed Aug. 21, 1985 now abandoned.

BACKGROUND OF THE INVENTION

The present invention relates to carriers for beverage containers, and is particularly concerned with their use in vehicles which are moving, although their use in other environments is equally possible.

Many drivers, such a truck drivers who may need to drive their trucks for long periods of time in uncomfortably hot conditions, would like to be able to take occasional sips of drink directly from a can, for example, without having the problem of dealing with the can between sips.

If the can is put on the dashboard or the floor it will topple over when the truck corners or brakes sharply. If the can is carried in one hand by the driver, there is the danger that the driver may not be able to control the truck adequately. If the can is jammed into some opening in the cab, it may damage the cab yet still topple over.

Similar problems are met in any situation where a person has a beverage container but there is no convenient and safe location for receiving the beverage container between sips. For example, a person in a wheelchair may need both hands free to control the wheelchair, a coach passenger may need both hands free to read a magazine, a cyclist may need both hands free to steer the bicycle, and a person on a yacht may need both hands free to control the sails.

The beverage container need not necessarily be a can, such as the conventional aluminium-bodied rip-top can for soft drinks, but could be a wine glass, goblet, beaker or mug formed of any conventional material.

SUMMARY OF THE INVENTION

In accordance with the present invention, a carrier for a beverage container comprises a holder extending from a body, the body being capable of being secured to a support, and the holder defining an opening, the opening being capable of receiving a beverage container.

Preferably, the holder includes a pair of arms defining the opening therebetween, the pair of arms having opposed free ends spaced apart by a dimension less than a parallel dimension of the opening.

The opposed free ends of the arms provide a constriction to the opening for use in resisting any tendency for a beverage container to tip away from the body. It is expected that normally the other ends of the arms will be joined together and the opening will be of part-circular outline. However, the fact that the opposed free ends of the arms are spaced apart from one another permits the arms to be resiliently deformable. A beverage container of appropriate dimensions can thus be arranged to be a snap fit or a push fit within the opening.

Even if the arms could not be flexed at all, or if the holder extended continuously around the opening and did not include a pair of arms, the opening would still be capable of receiving a beverage container of appropriate shape. The beverage container would then have for example a frusto-conical, shouldered or flanged side wall. The beverage container could have a bowl portion above a stem portion, as in a conventional pedestal wine glass, with the bowl resting in the opening in the holder.

Preferably, there is means for releasably securing the body to a support, although the body may be permanently fixed to a support by for example adhesive or screws.

Said releasable securing means may include a tongue extending from the body. The tongue may be rigid and in combination with the body provide a channel for clipping onto a retaining portion of the support. Alternatively, there may be a flexible tongue extending from the body to be pushed into a slotted portion of the support. Either of these arrangements can be used for releasably securing the body to a vehicle door by its window. The flexible tongue, or that limb of the rigid tongue remote from the body, can be pushed into the slot which is necessarily present between the window and the body of the door. In other situations, however, it may be more convenient for the rigid or flexible tongue to be clipped onto a bracket forming part of the support.

The end of the rigid or flexible tongue remote from the body may be tapered to provide a thinned entering end for ease of initial location with the support.

The rigid tongue may be formed from a plurality of pieces which can be combined in different ways to provide channels of different sizes to suit the circumstances of any particular application. The pieces of the rigid tongue may be fastened together by dovetailed tongue-and-groove connections. The body of the carrier may be provided with a slot for receiving one end of the rigid tongue, and may be provided with a further slot for receiving, possibly as a spare, one of the pieces of the rigid tongue. The rigid tongue may be secured to the body of the carrier by a pin extending through two holes in the body on either side of an aligned hole in the adjacent piece of the rigid tongue. If each of the pieces of the rigid tongue is formed with a series of holes along its length, rather than a single hole, this permits an even finer adjustment of the sizes of the channels capable of being presented thereby.

Preferably, the tongue is removable from the body rather than being integrally formed with the body. However, regardless of whether or not the tongue is rigid or flexible, or is formed in one piece or a plurality of pieces, it need not necessariliy be secured to the body by the pin-and-hole arrangement mentioned hereinabove. It could possibly merely be a tight push fit with the body or could alternatively be secured by a ratchet-and-pawl connection. For example, the body may be formed with a resilient pawl presenting one or more teeth capable of flexing along all or part of one edge of a slot extending through the body for receiving the tongue, which is formed with a series of complementary teeth along its length and fully or partly across its width. It may be possible to shorten the tongue by cutting it should it extend too far through the slot. It may be possible to release the tongue by pressing the pawl out of engagement with the complementary teeth on the tongue. The ratchet-and-pawl connection again provides means for fine adjustment of the position of the tongue relatively to the body, and thus fine adjustment of the size of the channel provided by a rigid tongue in combination with the body. It also avoids the need for the pin which could be awkward to handle, and allows easier packaging of any tongue because of its initially detached state separated from the body.

A similar ratchet-and-pawl connection could be provided between the further slot mentioned hereinabove and the spare piece of the rigid tongue. By altering the position of the spare piece with respect to said further slot, it is possible to alter the angle of the body with respect to the support. For example, if the support is a vertical surface, increasing the exposed length of the spare piece holding the body away from the support will increase the angle of tilt of the carrier. The so-called spare piece may of course be a member specifically designed as part of means for controlling the tilt of the body relatively to a support, and thus need not be alternatively capable of use as one of the plurality of pieces for forming the tongue.

In fact, the body does not necessarily need either a rigid tongue or a flexible tongue provided it is capable of being secured to the support. If the carrier is to be used on the handlebar of a bicycle or the tubular framework of a wheelchair, for example, it may be convenient to provide a mounting plate associated with a tubular clip. The mounting plate may be provided with a hooked portion for locating securely with a hooked portion formed on the body of the carrier. The mounting plate could be formed to allow control of the orientation of the body relatively to the support, for example the mounting plate may be of disc-like construction and may be a snap fit with the body, the mounting plate possibly also carrying means such as a strap for fastening around a wheelchair framework. The mounting plate may further, or alternatively, be provided with a tongued portion for locating securely with a complementary grooved or slotted portion formed in the body of the carrier. Both the hooked portion of the body and the grooved or slotted portion of the body thus constitute alternative means for releasably securing the body to a support. If the support is not tubular, the tubular clip could be omitted and the mounting plate secured directly to the support. If the support is a bracket otherwise intended for a lamp on a bicycle, for example, the hooked portion of the body of the carrier may be capable of being secured directly thereto, or the grooved or slotted portion of the body of the carrier may be capable of being secured directly thereto, with the result that even the mounting plate could be omitted.

Preferably, the holder is pivotally mounted to the body, rather than being immovably mounted to the body, and may be moved between an operative preferably generally horizontal position for receiving the beverage container, and an inoperative preferably generally vertical position for reducing the risk that the holder presents an obstruction when not in use, and also for allowing better packaging.

It may be possible, particularly when the holder includes a pair of arms and the arms are resiliently deformable, for the holder to be positively retained in its inoperative position, for example by providing an interference fit between the body and the arms, thus countering the effect of any disturbance such as vehicle vibration or yacht pitching and rolling.

The pivotal mounting of the holder to the body may be achieved by the provision of apertured lugs on the body which receive therebetween an apertured lug on the holder. When assembled, the apertures of all three lugs are aligned to receive a hinge pin. Alternatively, the hinge pin may be omitted and the holder may be pivotally mounted to the body by a pair of aligned studs rotable within respective cavities. The studs may be formed on the holder and the cavities may be formed in the body. Moreover, the studs may be of circular cross-section apart from chord-like flats and the cavities may be of circular cross-section approached through mouths of restricted dimensions. Such an arrangement allows the studs to pass through the mouths into the cavities only when the holder is in a predetermined attitude such as 45° with respect to the body. After the studs have fully entered the cavities, the holder may be swung up or down to positions in which the studs cannot be pulled out of the cavities. In yet another alternative, however, which also omits the hinge pin, the holder is formed integrally with the body and is pivotally mounted to the body by a portion of reduced thickness constituting a hinge.

To reduce the strain put on the pivotal mounting, the body may be formed with a pair of opposed abutments such that one face of the holder abuts one of the abutments on the body and the other face of the holder abuts the other of the abutments on the body to produce a cantilever effect when the holder is in its operative position. More particularly, there may be one or more shoulders on the body beneath the holder and a slot in the body for receiving a heel forming part of the holder. When the holder is in its operative preferably generally horizontal position, the upper surface of the heel comes into abutment with an upper face of the slot in the body and the lower surface of the holder comes into abutment with the shoulder or shoulders on the body. It will be appreciated that the above-noted cantilever effect ensures that the weight on the holder is taken directly by the body rather than the pivotal mounting.

To increase the resistance to pull-out of the holder from the body, particularly in the situation where the pivotal mounting of the holder to the body includes the studs rotatable within the cavities, the heel may have a lip on its upper surface at its free edge for locating in a complementary rebated edge of the body by the slot for receiving the heel.

The body may be provided with a base extending therefrom, the base being capable of helping to retain a beverage container received in the opening in the holder. That end of the base remote from the body may have a protrusion directed towards the holder for locating with a recessed bottom face of a beverage container. The protrusion may define part of a segmental groove formed in the base and generally corresponding in shape to a bottom rim of a beverage container in the form of a can.

The body may further, or alternatively, be provided with a flange extending therefrom, the flange being capable of helping to retain a plate received on the holder. Again, that end of the flange remote from the body may have a protrusion directed towards the holder for locating with a raised rim of a plate. The protrusion may define part of a segmental groove formed in the flange and generally corresponding in shape to a raised rim of a plate.

The plate is supported by virtue of a cantilever effect similar to that discussed above with regard to the pivotal mounting of the holder. The segmental groove presented by the flange, and indeed the base, may be formed by three abutments in the form of separate blocks. The front edge of the flange can lend upright support to a beverage container such as a can by resisting any tendency for the can to tip towards the body. If the undersurface of the plate is formed with ribs, it may be convenient to form the holder with upstanding studs to allow the plate to achieve a generally horizontal attitude.

A particularly suitable plate is that disclosed in European patent publication No. 0 106 626.

It will be appreciated that the plate disclosed in said European patent publication No. 0 106 626 is capable of supporting a pedestal wine glass. It should now be appreciated that a pedestal wine glass can be secured to the preferred carriers of the present invention. This is achieved by providing the holder with the above-noted pair of arms defining the opening therebetween, and by arranging that the other ends of the arms are joined together, the opening is of part-circular outline, the arms are resiliently deformable, and the arms have means defining a receiver. The means may protrude from or extend into the arms so that the receiver is capable of engagement, preferably snap engagement, with a rim of a generally planar base of a pedestal wine glass. The means may be an undercut rebate.

Preferably, the carrier is formed of a plastics material, such as the acetyl plastics material known as Delrin (RTM).

BRIEF DESCRIPTION OF THE DRAWINGS

A carrier for a beverage container, in accordance with the present invention, will now be described, by way of example only, with reference to the accompanying drawings, in which.

DETAILED DESCRIPTION OF THE PREFERRED EMBODIMENT

Figure 1:
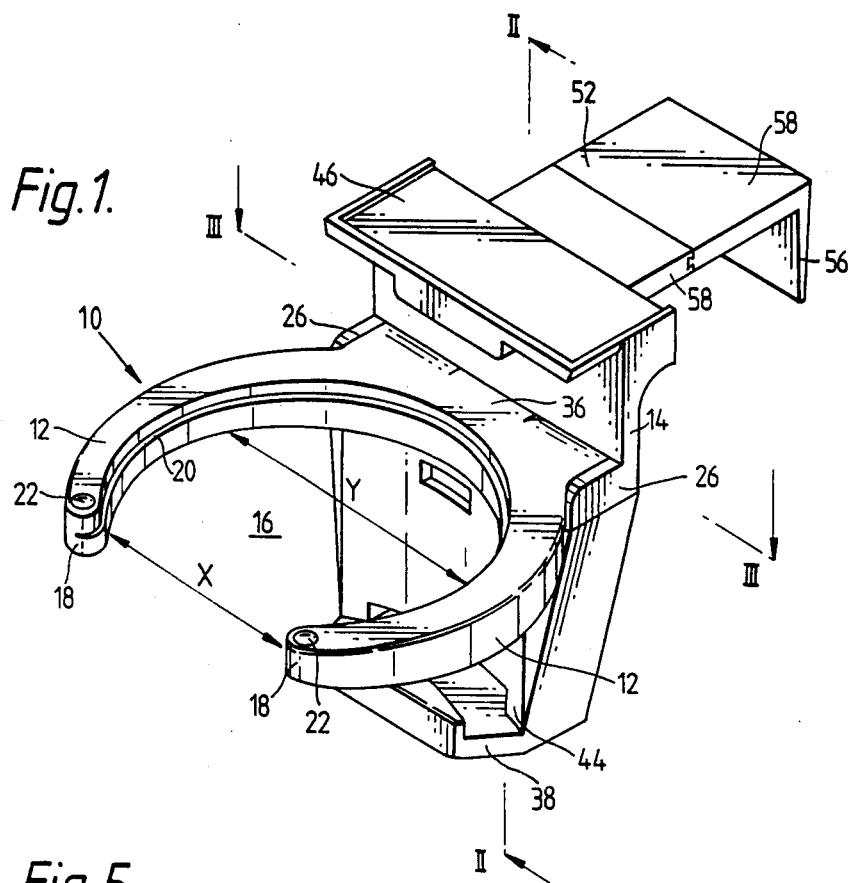
FIG. 1 is a perspective view of the carrier in its operative position.
Figure 5:
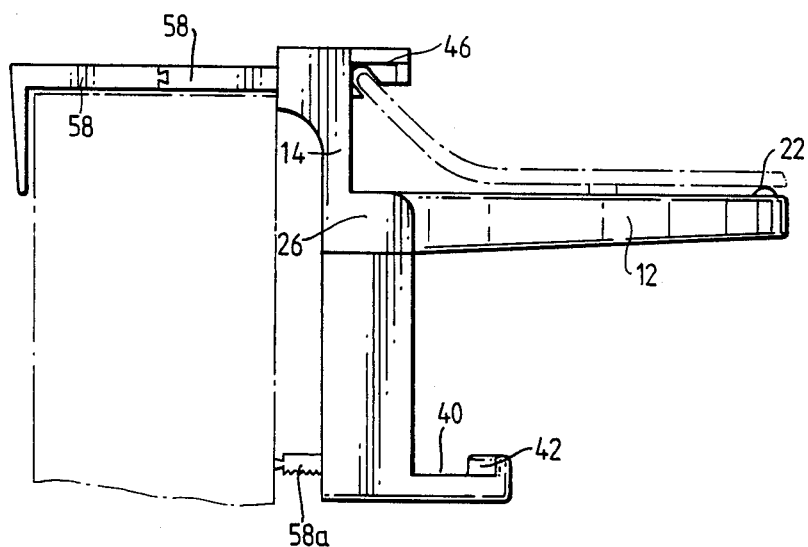
FIGS. 5, 6 and 7 are, respectively, side, rear and underneath views of FIG. 1.
Figure 2:
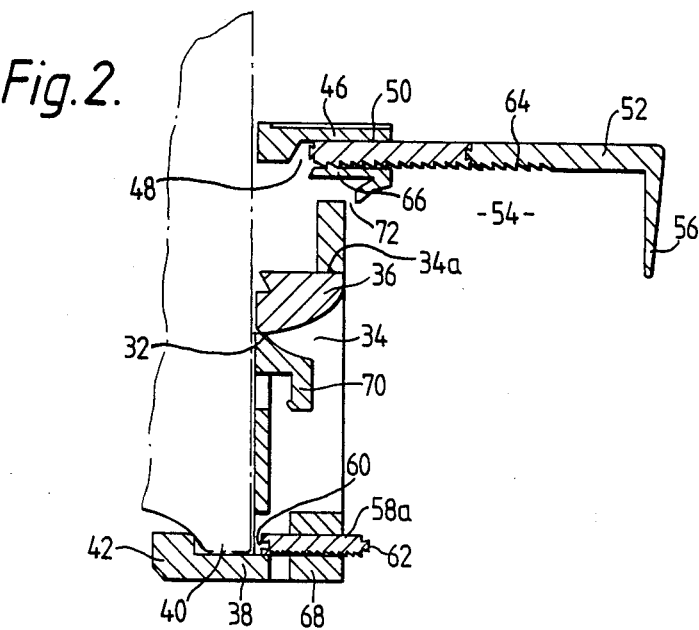
FIGS. 2 and 3 are, respectively, cross-sections taken along the lines II—II and III—III of FIG. 1.
Figure 3:
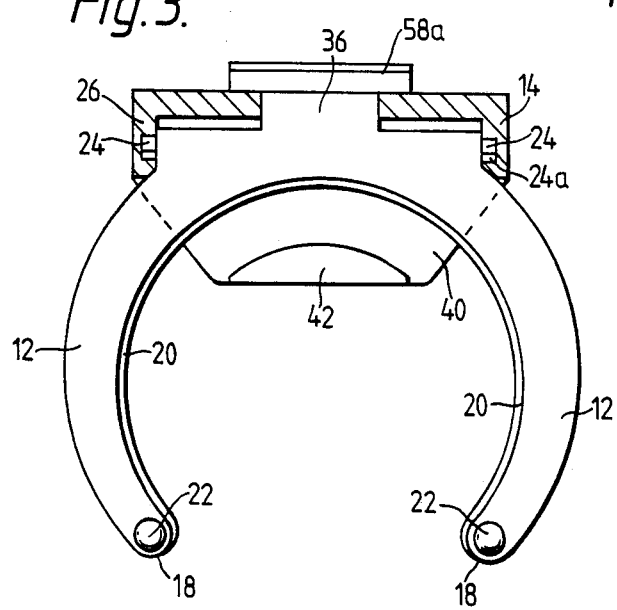

A preferred carrier, in accordance with the present invention, comprises a holder 10 including a pair of arms 12 extending from a body 14 which is capable of being secured to a support, the pair of arms 12 defining therebetween an opening 16 which is capable of receiving a beverage container, and the pair of arms 12 having opposed free ends 18 spaced apart by a dimension X less than a parallel dimension Y of the opening 16.

Each of the arms 12 is resiliently deformable and is part circular when viewed in plan, the arms 12 being integrally moulded so that the holder 10 is a unitary member which bounds approximately 280° of the periphery or outline of the opening 16.

The upper inner edges of the arms 12 are provided with a continuously extending, slightly undercut, rebate 20 which acts as a receiver into which a rim of a generally planar base of a pedestal wine glass can be snapped.

The free ends 18 of the arms 12 are formed with respective upstanding studs 22 for contacting the base of a combined plate and glass holder of the kind disclosed in European patent publication No. 0 106 626.

Figure 4:
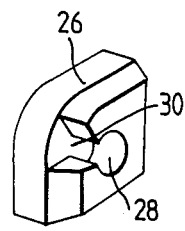
FIG. 4 is a fragmentary enlarged perspective view of part of a pivotal mounting.
Figure 6:
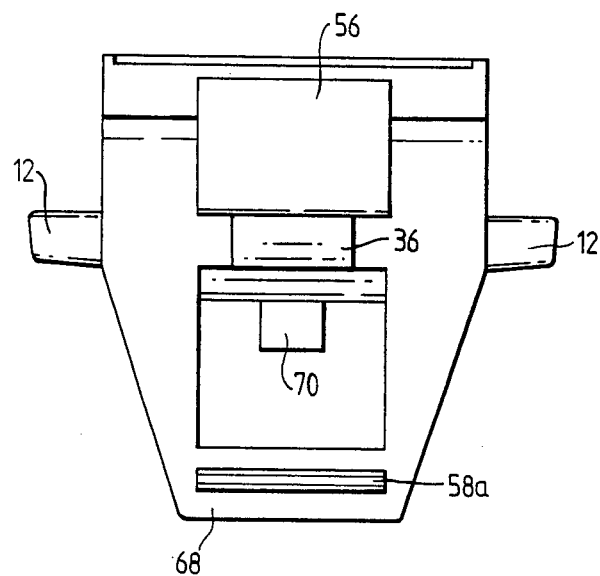
Figure 7:
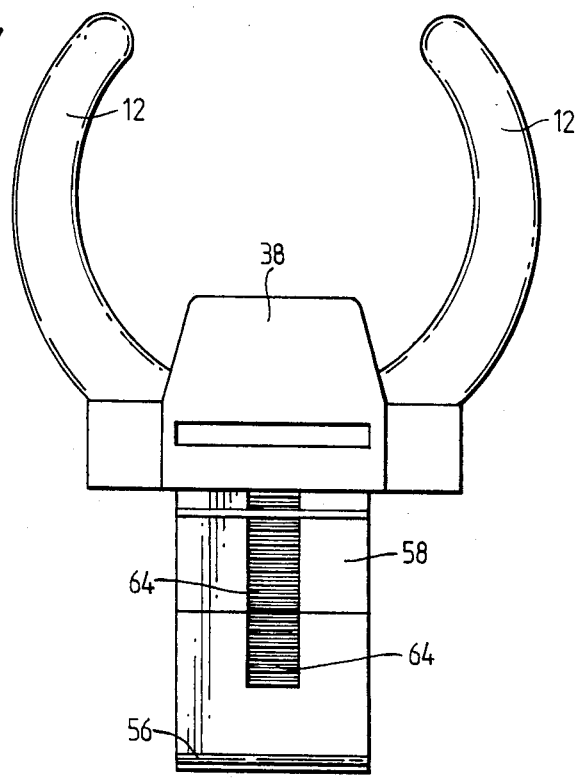
Figure 8:
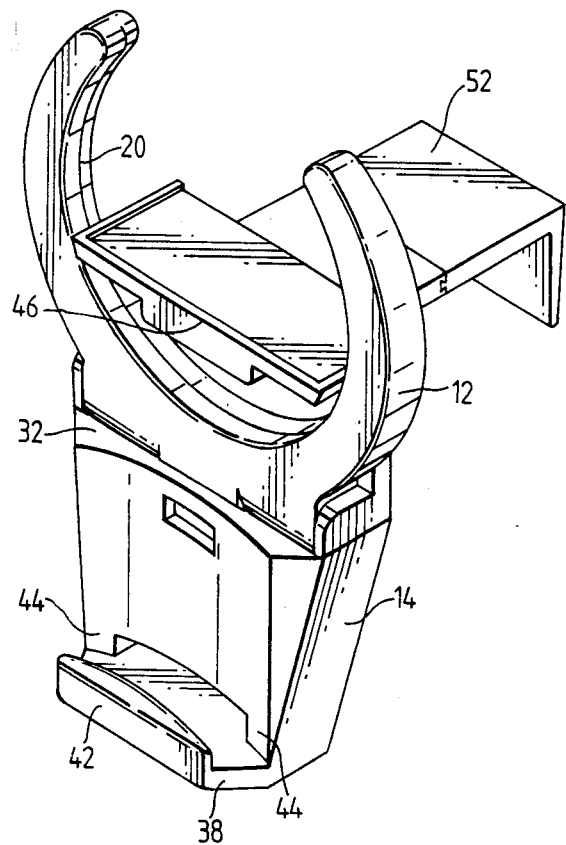
FIG. 8 is a perspective view of the carrier in its inoperative position.

The arms 12 are pivotally mounted to the body 14 by the provision on the holder 10 of a pair of studs 24 which locate in respective ones of a pair of bosses 26 provided on the body 14. Each of the bosses 26 has a cavity 28 of circular cross-section approached through a mouth 30 (FIG. 4). Each of the studs 24 has a circular cross-section complementary to the associated cavity 28 apart from two opposed chord-like flats 24a, which are spaced apart by a dimension complementary to the smallest dimension of the associated mouth 30. The arrangement is such that flats 24a of the studs 24 can pass through the mouths 30 into the cavities 28 in the bosses 26 only when the arms 12 are at an angle of 45° to the body 14. After the studs 24 have been fully inserted into the cavities 28, the arms 12 may be swung up or down to attitudes in which the studs 24 cannot be pulled out of the cavities 28.

To reduce the strain put on the pivotal mounting, the body 14 is formed with a shoulder 32 extending beneath the arms 12, and is also formed with a slot 34 for receiving a heel 36 forming part of the holder 10. When the arms 12 are in their operative, generally horizontal position, the upper surface of the heel 36 abuts an upper face 34a of the slot 34 in the body 14, and the lower surfaces of the arms 12 abut the shoulder 32 on the body 14.

The lower end of the body 14 is provided with a base 38, for extending beneath and taking the weight of a canned drink received in the opening 16, the base 38 being provided with a segmental groove 40 sufficiently large to be able to receive and locate the raised rim at the bottom of various sizes of canned drink. The segmental groove 40 is defined by a protrusion 42 at a front edge of the base 38 remote from the body 14 and by a pair of abutments 44 at side parts of the rear edge of the base 38 closest to the body 14.

The upper end of the body 14 is provided with a flange 46 having three abutments arranged in the same manner as the abutments on the base 38 to present another segmental groove 48 for receiving and locating with the raised rim at the top of various sizes of the combined plate and glass holder mentioned hereinbefore.

To releasably secure the arms 12 and the body 14 to a support, such as the inside of the door of a vehicle, the upper end of the body 14 is provided with a slot 50 for receiving a rigid tongue 52. The body 14 and the tongue 52 define therebetween a channel 54 to be clipped onto the vehicle door, with a limb 56 of the tongue 52 extending between the window and the body of the door.

The tongue 52 is shown assembled from two pieces 58 with a further extension piece 58a being provided in case the channel 54 needs to be even larger. The various pieces can be fastened together by dovetailed tongue-and-groove connections as indicated by female portion 60 and male portion 62. The lower surface of each of the pieces 58 and 58a is formed with a series of teeth 64, or serrations, which can make ratchet-like engagement with a toothed pawl 66 resiliently mounted by the slot 50 and forming part of the body 14. A similar toothed pawl 68 can engage with the extension piece 58a to alter the angle of tilt of the carrier when mounted against a vertical support. The ratchet tooth on the pawl 66 may slope in the reverse direction to the ratchet tooth on the pawl 68, because it is easier to release the pawl 66 from the front of the body 14 and the pawl 68 from the rear of the body 14.

A hooked portion 70 is provided in case the tongue 52 is replaced by a mounting plate, or similar support, and a slotted portion 72 is provided by the pawl 66 in case the mounting plate has an upwardly extending tongue.

I claim:

1. A beverage container carrier, comprising:
    (a) a holder (10) extending from a body (14), the body being capable of being secured to a support, the holder defining an opening (16) capable of receiving a beverage container, and the body having both a base (38) and a flange (46) extending outwardly therefrom below and above the holder, respectively, with the flange (46) being formed with a groove (48) facing the holder and extending laterally of the body;

(b) the holder including a pair of arms (12) which define said opening therebetween and which have opposed free ends (18) spaced apart by a distance (X) less than a parallel distance (Y) extending across an interior central portion of the opening; and (c) the holder being pivotally mounted (24, 26) to the body, about an axis extending laterally of the body, for movement between an operative outwardly extending position, in which either a beverage container can be received in the opening (16) defined by the pair of arms and be stood on the base (38), or alternatively a rimmed plate can be carried by the pair of arms (12) such that the rim of the plate engages in the groove (48) in the flange to maintain the plate on the pair of arms by a cantilever action, and an inoperative upwardly extending position in which the pair of arms flank and extend past each side of the flange (46);

(d) the body (14) being formed with both upper (34a) and lower (32) abutments such that, in said operative position of the holder, an upper face (36) of the holder abuts the upper abutment (34a) on the body and a lower face of the holder abuts the lower abutment (32) on the body to provide another cantilever action enabling the holder to support even a heavily laden plate.

2. A beverage container carrier according to claim 1, wherein the upper abutment (34a) forms an upper face of a slot through the body, and the lower abutment (32) is formed by a shoulder extending outwardly from the body.

3. A beverage container carrier according to claim 1, wherein the holder is pivotally mounted to the body by a pair of aligned studs (24) rotatable within respective cavities (28), the studs being of circular cross-section apart from chord-like flats (24a), and the cavities being of circular cross-section approached through mouths (30) of restricted dimension, the flats being capable of passing through the mouths only at a predetermined angular relationship of the holder with respect to the body.

4. A beverage container carrier according to claim 1, wherein the groove (48) in the flange is a segmental groove.

5. A beverage container carrier according to claim 1, wherein the pair of arms (12) are resiliently deformable and the opening (16) is of part-circular outline, upper inner edges of the pair of arms having a continuously extending, undercut rebate (20) which, by virtue of resilient deformation of the arms, is capable of engagement with a rim of a generally planar base of a pedestal wine glass.

6. A beverage container carrier according to claim 5, wherein the pair of arms (12) are resiliently deformed to make an interference fit with the sides of the flange (46) in said inoperative position.

7. A beverage container carrier according to claim 1, wherein a tongue (52) extends rearwardly from an upper rear portion of the body for mounting the carrier to a window ledge of a vehicle door.

8. A beverage container carrier according to claim 7, wherein a further tongue (58a) extends rearwardly from a lower rear portion of the body for controlling the tilt of the body relatively to the vehicle door.

* * * * *